United States Patent [19]

Kunz

[11] Patent Number: 4,927,642

[45] Date of Patent: May 22, 1990

[54] APPARATUS FOR WELDING TUBULAR COMPONENTS OF THERMOPLASTIC MATERIAL

[75] Inventor: Peter Kunz, Schaffhausen, Switzerland

[73] Assignee: Georg Fischer AG, Schaffhausen, Switzerland

[21] Appl. No.: 237,903

[22] Filed: Aug. 29, 1988

[30] Foreign Application Priority Data

Sep. 23, 1987 [CH] Switzerland .................. 03680/87

[51] Int. Cl.⁵ .................. B29C 65/14; B28B 21/96
[52] U.S. Cl. .................. 425/508; 156/158;
156/304.2; 156/304.6; 156/499; 156/503;
264/248; 264/314; 425/521; 425/442
[58] Field of Search .................. 425/11, 14, 25, 27,
425/500, 501, 503, 517, 384, 123, 174.4, 325,
326.1, DIG. 112, DIG. 248, 508, 521, 442;
264/248, 249, 259, 263, 36, 269, 314, 573, 572;
156/503, 544, 556, 158, 98, 304.3, 304.2, 379.7,
296, 304.6, 157, 156, 499, 502

[56] References Cited

U.S. PATENT DOCUMENTS

| | | | |
|---|---|---|---|
| 3,013,925 | 12/1961 | Larsen | 264/248 |
| 3,484,321 | 12/1969 | Oswald | 156/503 |
| 3,634,167 | 1/1972 | Plontke | 156/257 |
| 3,666,586 | 5/1972 | Lacey | 156/98 |
| 4,132,578 | 1/1979 | Gell, Jr. | 264/248 |
| 4,211,594 | 7/1980 | Freitag et al. | 156/304.3 |
| 4,239,574 | 12/1980 | Aust et al. | 156/267 |
| 4,449,038 | 5/1984 | Reich et al. | 156/379.7 |
| 4,602,974 | 7/1986 | Wood et al. | 264/269 |
| 4,694,335 | 9/1987 | Lyall | 156/304.2 |
| 4,801,349 | 1/1989 | Dommer et al. | 156/304.2 |

FOREIGN PATENT DOCUMENTS

| | | |
|---|---|---|
| 020915 | 4/1980 | European Pat. Off. . |
| 312270 | 12/1973 | Fed. Rep. of Germany . |
| 2316749 | 5/1974 | Fed. Rep. of Germany . |
| 2302559 | 8/1974 | Fed. Rep. of Germany ... 425/174.4 |
| 2308078 | 8/1974 | Fed. Rep. of Germany ...... 156/503 |
| 2830722 | 10/1979 | Fed. Rep. of Germany ...... 156/158 |
| 215039 | 10/1984 | German Democratic Rep. ............. 156/304.2 |
| 58-29617 | 2/1983 | Japan ............ 156/304.2 |
| 61-114827 | 6/1986 | Japan ............ 425/384 |
| 80-02124 | 10/1980 | PCT Int'l Appl. ........ 156/304.2 |
| 200141 | 7/1967 | U.S.S.R. ............ 156/158 |
| 514670 | 5/1976 | U.S.S.R. ............ 156/158 |
| 563298 | 6/1977 | U.S.S.R. ............ 156/503 |
| 573363 | 9/1977 | U.S.S.R. ............ 156/158 |
| 642191 | 1/1979 | U.S.S.R. ............ 156/158 |
| 1141006 | 2/1985 | U.S.S.R. ............ 156/503 |
| 1549169 | 7/1979 | United Kingdom . |

Primary Examiner—Jan H. Silbaugh
Assistant Examiner—Mathieu Vargot
Attorney, Agent, or Firm—Toren, McGeady & Associates

[57] ABSTRACT

An apparatus for welding tubular components of thermoplastic material. The apparatus includes a heating device for heating the ends of the tubular components to be welded together until the melting range of the thermoplastic material is reached. Two outer support rings which are slid toward each other after the thermoplastic material has melted and an expandable inner support member ensure that welding pressure is built up, so that a welded connection can be obtained which is strong and free of welding beads.

3 Claims, 1 Drawing Sheet

APPARATUS FOR WELDING TUBULAR COMPONENTS OF THERMOPLASTIC MATERIAL

BACKGROUND OF THE INVENTION

1. Field of the Invention

The present invention relates to an apparatus for welding tubular components of thermoplastic material.

2. Description of the Prior Art

In a method known from German reference 2,212,055, the ends of tubular components of thermoplastic material are heated by means of an electrically heatable heating reflector and the components which are braced in the device according to this reference are pressed with the ends thereof against each other after the heating reflector has been swung away, so that butt welding is created. This method has the disadvantage that a welding bead is formed particularly at the outer circumference and also at the inner circumference of the tubular components. This welding bead reduces the passage area through the tubular components and increases the flow resistance.

Since the heating reflector comes into direct contact with the tubular components, the heating reflector can be easily contaminated when the material of the components is melted, so that a problem-free welding is only possible if the heating reflector is frequently cleaned.

It is, therefore, the primary object of the present invention to provide a method of the above-described type in which the formation of a welding bead at the inner circumference of the tubular components at the welded connection is avoided and a secure welded connection is ensured which is to be as smooth as possible at the outer cicumference of the tubular components. The apparatus required for carrying out this method is to be of simple construction and should be usable without requiring substantial maintenance even at the construction site with the tubular components already put in place.

SUMMARY OF THE INVENTION

In accordance with the present invention, the ends of the tubular components are heated by radiation heat without contact at the outer circumference thereof at least until the melting point of the thermoplastic material is reached. Subsequently, two preheated support rings are slid toward each other on the outer circumference of the ends of the tubular components. The ends of the tubular components are then immediately joined together in a controlled manner. Subsequently, an expandable support means is pressed against the inner circumference of the abutting ends of the tubular components. After the welding procedure has been concluded, the expansion of the support means is reversed and the support means is pulled out of the tubular components.

The apparatus according to the present invention includes bracing devices for moving the tubular components coaxially and toward each other. The apparatus further includes an annular heating device for generating radiation heat, heatable outer support rings which can be slid toward each other and an expandable inner support device.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
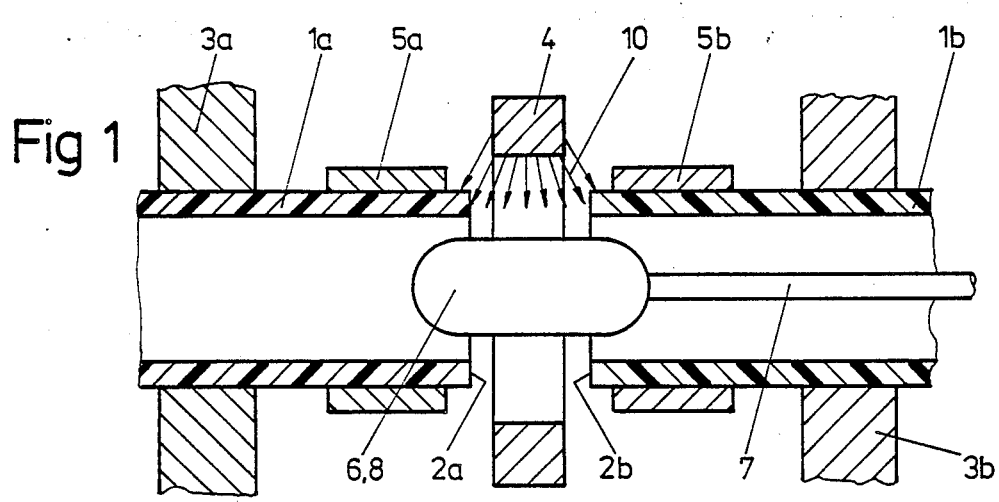
FIG. 1 is a schematic sectional view in the apparatus according to the present invention in a first stage of operation.

FIG. 1 of the drawing shows the ends of two tubular components 1a and 1b which are mounted coaxially spaced apart in bracing devices 3a, 3b which can be moved toward each other. An annular heating device 4 for generating radiation heat is arranged between the ends of the tubular components 1a and 1b.

Outer support rings 5a, 5b are arranged on the tubular components 1a, 1b spaced from the end faces 2a, 2b of the tubular components 1a, 1b. The outer support rings 5a, 5b are slidable axially relative to each other and the outer diameter of the outer support rings 5a, 5b is smaller than the inner diameter of the heating device 4.

An expandable inner support device 6 is arranged in the interior of the ends of the tubular components 1a, 1b. The inner support device 6 is provided with a pull strand 7. The inner support device 6 preferably is an expandable casing 8 made of a heat-resisting elastomer or silicon. The casing 8 may be expanded, for example, mechanically by axially pulling the casing together by actuating the pull strand. Another simple way of expanding the casing 8 is by constructing the pull strand 7 as a hose through which a pressure medium, for example, compressed air, is supplied to the casing. As a result, the casing can be pressed with an adjustable pressure against the inner circumference of the tubular components 1a, 1b in the region where the tubular components are joined.

It is also possible to arrange in the interior of the casing 8 a medium which expands when heated and an electric heating device, so that when current is supplied through a cable arranged in the pull strand, the casing is expanded.

The tubular components 1a, 1b are welded together as follows.

As shown in FIG. 1, the ends of the tubular components 1a, 1b are heated without being in contact by means of radiation heat provided by the heating device, as shown by arrows 10. The tubular components 1a, 1b are heated at the outer circumference and the end faces thereof until the melting range of the thermoplastic material is reached.

Subsequently, the two preheated outer support rings 5a, 5b are slid toward each other over the ends of the tubular components 1i a, 1b until the outer support rings 5a, 5b make contact and the ends of the tubular components 1a, 1b are then immediately joined together in a guided manner by axially displacing the bracing devices 3a, 3b. The ends of the tubular components 1a, 1b are preferably joined together with an adjustable pressure. This stage of the welding procedure is illustrated in FIG. 2.

Figure 3:
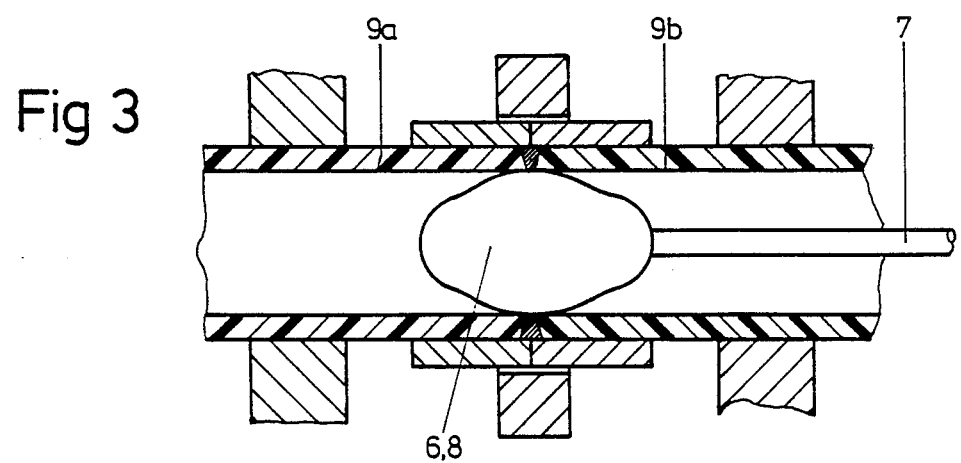
FIG. 3 is a schematic sectional view in the apparatus according to the present invention in a third stage of operation.

Subsequently, as illustrated in FIG. 3, the inner support device 6 is pressed against the inner circumference 9a, 9b of the tubular components 1a, 1b by expanding the casing 8 in the region of the welding connection. The expansion of the casing 8 causes the thermoplastic material forced inwardly during joining of the tubular components to be pressed back, so that this welding pressure ensures that a direct and secure welded connection is created without inner and outer welding beads. The surface of the casing pressed against the inner circumference of the tubular components ensures that a smooth inner wall is created in the region of the welded connection, so that the entire pipeline formed by the tubular components has excellent flow conditions.

Figure 2:
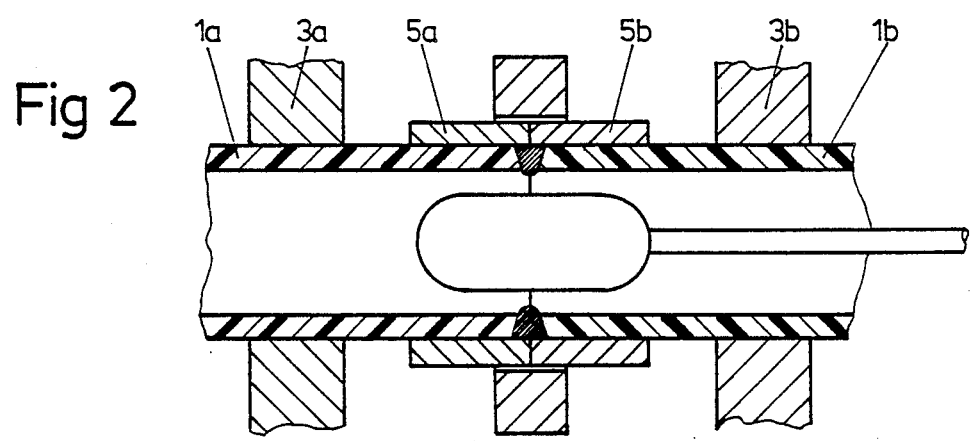
FIG. 2 is a schematic sectional view in the apparatus according to the present invention in a second stage of operation.

After the thermoplastic material at the welded connection has hardened, the casing 8 is deformed back to its original cicumferential shape as shown in FIG. 2 and is pulled out of the pipeline at an end thereof by means of the pull strand 7.

The bracing devices 3a, 3b, the outer support rings 5a, 5b and the heating device 4 are each constructed in two pieces which are hinged to each other, so that the welded tubular components 1a, 1b can be removed.

While a specific embodiment of the invention has been shown and described in detail to illustrate the application of the inventive principles, it will be understood that the invention may be embodied otherwise without departing from such principles.

I claim:

1. Apparatus for welding tubular components of thermoplastic material, the tubular components having an axis, ends to be joined facing each other and an inner and an outer circumference, the apparatus comprising bracing devices for holding and moving the tubular components coaxially and toward each other, an annular heating device positioned between the bracing devices for generating radiation heat for heating the spaced-apart ends of the tubular components by radiation heat without contact at the outer circumference thereof at least until the melting point of the thermoplastic material is reached, preheatable support rings slidable toward each other in axial direction on the outer circumference of the tubular components prior to joining the ends of the tubular components, said support rings positioned intermediate the bracing devices and within the annular heating device, and an expandable support means positioned within the support rings and annular heating device, said expandable support means capable of being pressed against the inner circumference of the tubular components after the ends of the tubular components have been joined.

2. The apparatus according to claim 1, wherein the heating device and the support rings are each constructed of two pieces, the two pieces being hinged relative to each other.

3. The apparatus according to claim 1, wherein the expandable support means is an elastic casing, a pull strand being connected to the casing.

* * * * *